(12) United States Patent
Tomizaki et al.

(10) Patent No.: US 9,276,512 B2
(45) Date of Patent: Mar. 1, 2016

(54) MOTOR CONTROLLER AND CONSTRUCTION MACHINE PROVIDED THEREWITH

(71) Applicants: SINFONIA TECHNOLOGY CO., LTD., Tokyo (JP); KOBELCO CONSTRUCTION MACHINERY CO., LTD., Hiroshima-shi, Hiroshima (JP)

(72) Inventors: Takeshi Tomizaki, Tokyo (JP); Yuichi Hamaguchi, Tokyo (JP); Takeo Ito, Tokyo (JP); Akira Nakazumi, Hiroshima (JP); Yusuke Kamimura, Hiroshima (JP)

(73) Assignees: SINFONIA TECHNOLOGY CO., LTD., Tokyo (JP); KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/289,886

(22) Filed: May 29, 2014

(65) Prior Publication Data

US 2014/0354205 A1 Dec. 4, 2014

(30) Foreign Application Priority Data

May 30, 2013 (JP) ................................ 2013-113580

(51) Int. Cl.
*H02P 21/00* (2006.01)
*H02P 3/24* (2006.01)

(52) U.S. Cl.
CPC .............. *H02P 21/0035* (2013.01); *H02P 3/24* (2013.01)

(58) Field of Classification Search
CPC .................................................... H02P 21/0035
USPC ........................ 318/490, 400.02, 400.01, 700
See application file for complete search history.

(56) References Cited

U.S. PATENT DOCUMENTS

| 6,946,814 B2 * | 9/2005 | Takemori ................. H02P 8/16 318/685 |
| 7,728,557 B2 * | 6/2010 | Iwatsuki et al. .............. 320/136 |
| 8,446,114 B2 * | 5/2013 | Tsuji et al. ............... 318/400.02 |

FOREIGN PATENT DOCUMENTS

JP 3225771 B2 11/2001
JP 2010-202135 A 9/2010

* cited by examiner

*Primary Examiner* — David S Luo
(74) *Attorney, Agent, or Firm* — Westerman, Hattori, Daniels & Adrian, LLP (57) ABSTRACT

There is provided a motor controller capable of suppressing the rotation of a motor at the time of discharging an electric accumulator, and a construction machine provided with the motor controller. A motor controller 10 is provided with a current controller 1 for controlling an electric current supplied from an electric accumulator E to a motor M, and a rotation detector 2 for detecting the rotation of the motor M. The current controller 1 supplies only a d-axis current to the motor M according to a discharge command. If the rotation of the motor M is detected by the rotation detector 2 at the time of discharging the electric accumulator E, the current controller 1 controls the d-axis current so as to suppress the rotation of the motor M.

4 Claims, 8 Drawing Sheets

MOTOR CONTROLLER AND CONSTRUCTION MACHINE PROVIDED THEREWITH

BACKGROUND OF THE INVENTION

1. Field of the Invention

The present invention relates to a motor controller and a construction machine provided with the motor controller.

2. Description of the Related Art

Conventionally, various techniques concerning the securement of maintainability have been proposed for an operating machine or the like, the drive mechanism of which is partially motorized. For example, the operating machine disclosed in Japanese Patent Application Laid-Open Publication No. 2010-202135, when shut down, decouples a battery from a DC bus by switching operation and drives only a motor for cooling apparatus making use of electric charges from a capacitor connected to the DC bus. Consequently, the capacitor is discharged without rotating a motor for an engine. Accordingly, the voltage of the DC bus decreases to a harmless level even if a maintenance operator comes into contact with the DC bus.

In such a configuration as described above, however, discharge is not possible if the motor for cooling apparatus fails. In addition, such a configuration as described above is not applicable to operating machines without any cooling apparatus. On the other hand, Japanese Patent Publication No. 3225771 discloses a configuration in which a battery is discharged using a motor for vehicle travel, rather than a motor for cooling apparatus. In the configuration disclosed in Japanese Patent Publication No. 3225771, a given d-axis current is determined on the basis of the electric angle of the motor for vehicle travel and the battery is discharged with the motor in the stopped state by supplying only the d-axis current to the motor.

SUMMARY OF THE INVENTION

As described above, in the configuration disclosed in Japanese Patent Publication No. 3225771, currents are controlled so that only the d-axis current is supplied to the motor when the battery is discharged. If the phase of the d-axis current deviates from the original phase thereof, however, the motor may rotate in some cases. The motor may also rotate depending on the accuracy of the detected electric angle of the motor.

Hence, it is an object of the present invention to provide a motor controller capable of suppressing the rotation of a motor at the time of discharging an electric accumulator, and a construction machine provided with the motor controller.

A motor controller according to one embodiment is provided with a current controller for controlling a current supplied from an electric accumulator to a motor, and a rotation detector for detecting the rotation of the motor. The current controller supplies only a d-axis current to the motor according to a discharge command. If the rotation of the motor is detected by the rotation detector at the time of discharging the electric accumulator, the current controller controls the d-axis current so as to suppress the rotation of the motor.

According to the motor controller in accordance with one embodiment, it is possible to suppress the rotation of the motor at the time of discharging the electric accumulator.

DETAILED DESCRIPTION OF THE PREFERRED EMBODIMENTS

A motor controller according to one embodiment is provided with a current controller for controlling a current supplied from an electric accumulator to a motor, and a rotation detector for detecting the rotation of the motor. The current controller supplies only a d-axis current to the motor according to a discharge command. If the rotation of the motor is detected by the rotation detector at the time of discharging the electric accumulator, the current controller controls the d-axis current so as to suppress the rotation of the motor.

In the motor controller, the current controller controls the d-axis current so as to suppress the rotation of the motor, if the rotation detector detects the rotation of the motor while the electric accumulator is being discharged. As described above, it is possible to suppress the rotation of the motor since the motor controller controls the d-axis current supplied to the motor while monitoring the rotation of the motor. Here, the term "suppress" refers to reducing the number of revolutions of the motor to the extent of being not detrimental to maintenance work or stopping the rotation of the motor at the time of maintenance.

In the motor controller, the current controller may be configured to make the d-axis current smaller than the magnitude thereof at the moment the rotation of the motor is detected, if the rotation of the motor is detected by the rotation detector at the time of discharging the electric accumulator, so that the rotation of the motor stops. According to this configuration, the d-axis current can be maintained at a magnitude at which the motor does not rotate. Consequently, the electric accumulator can be efficiently discharged without rotating the motor.

Also in the motor controller, the current controller may be configured to decrease the d-axis current to zero if the rotation of the motor is detected by the rotation detector at the time of discharging the electric accumulator, and increase the d-axis current if the rotation of the motor is not detected by the rotation detector. According to this configuration, the electric accumulator can be discharged while preventing the motor from rotating as much as possible.

Alternatively, the current controller may be configured to decrease the d-axis current until the rotation of the motor stops, if the rotation of the motor is detected by the rotation detector at the time of discharging the electric accumulator. According to this configuration, the d-axis current can be maintained at a maximum magnitude at which the motor does not rotate. Consequently, it is possible to efficiently discharge the electric accumulator, while suppressing the rotation of the motor.

A construction machine according to one embodiment is provided with a motor, an electric accumulator for supplying an electric current to the motor, and the above-described motor controller.

The construction machine is provided with the motor controller and can, therefore, control the d-axis current supplied to the motor while monitoring the rotation of the motor with this motor controller. Consequently, it is possible to prevent the motor from rotating during the discharge of the electric accumulator and thus causing a vehicle body to travel or turn.

First Embodiment

Hereinafter, a first embodiment will be described with reference to the accompanying drawings.

Figure 1:
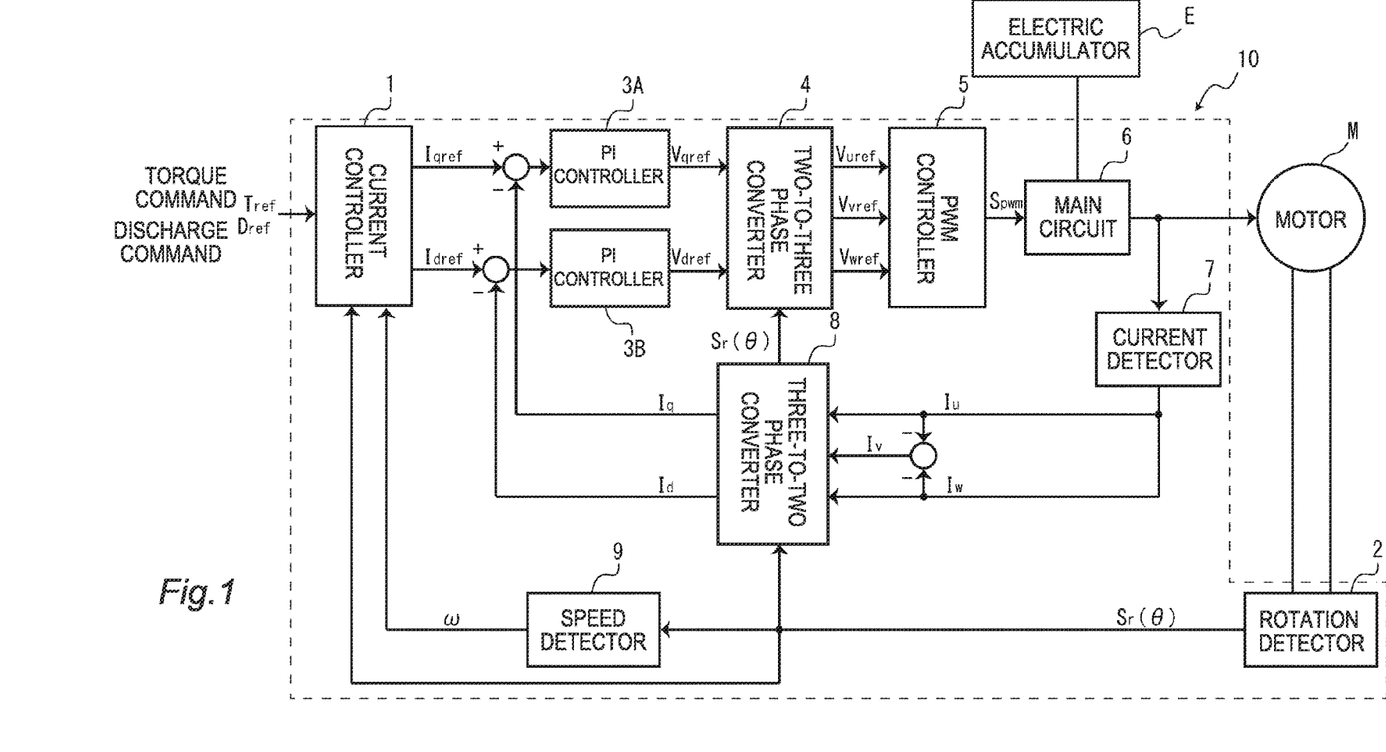
FIG. 1 is a functional block diagram of a motor controller according to first and second embodiments.

FIG. 1 illustrates a functional block diagram of a motor controller 10 according to the first embodiment. The motor controller 10 is arranged in a construction machine provided with an electric accumulator E and a motor M to control the rotation of the motor M used to, for example, drive an engine or cause a vehicle body to turn around. The motor controller 10 prevents the construction machine from traveling or turning by suppressing the rotation of the motor M at the time of discharging the electric accumulator E in particular. Note that the electric accumulator E may be a battery, a capacitor, a primary battery, a secondary battery or the like, though not limited thereto in particular. In addition, the motor M may be, for example, an IPM motor, though not limited thereto in particular.

As illustrated in FIG. 1, the motor controller 10 is provided with a current controller 1 for controlling an electric current supplied from the electric accumulator E to the motor M, and a rotation detector 2 for detecting the rotation of the motor M. The motor controller 10 is also provided with PI controllers 3A and 3B, a two-to-three phase converter 4, a PWM controller 5, a main circuit 6, a current detector 7, a three-to-two phase converter 8, and a speed detector 9.

Figure 2:
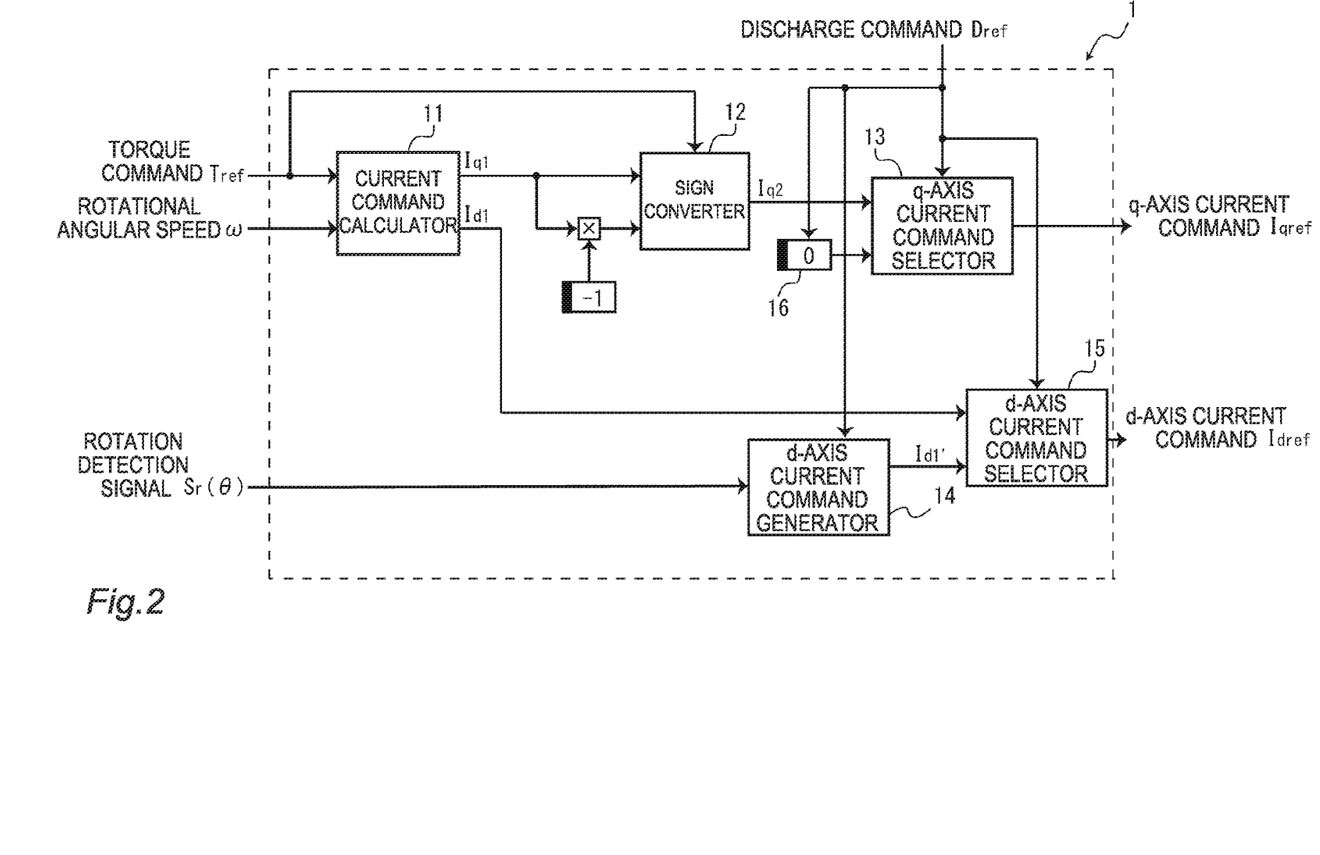
FIG. 2 is a functional block diagram of a current controller in the motor controller according to the first embodiment.

As illustrated in FIG. 1, a torque command $T_{ref}$ or a discharge command $D_{ref}$ is input from a host controller or the like to the current controller 1. The current controller 1 generates and outputs a current command depending on the input command. As illustrated in FIG. 2, this current controller 1 is provided with a current command calculator 11, a sign converter 12, and a q-axis current command selector 13. The current controller 1 is also provided with a d-axis current command generator 14 and a d-axis current command selector 15.

As illustrated in FIG. 2, the torque command $T_{ref}$ output from the host controller or the like during the normal control of the motor M and a rotational angular speed ω of the motor M detected by the speed detector 9 are input to the current command calculator 11. The current command calculator 11 calculates a normal-time q-axis current command $I_{q1}$ and a normal-time d-axis current command $I_{d1}$ depending on the torque command $T_{ref}$ and the rotational angular speed ω by a heretofore-known method. The current command calculator 11 outputs the normal-time q-axis current command $I_{q1}$ to the sign converter 12 and the normal-time d-axis current command $I_{d1}$ to the d-axis current command selector 15.

As illustrated in FIG. 2, the sign converter 12 converts the normal-time q-axis current command $I_{q1}$ so as to have the same sign as the torque command $T_{ref}$, and outputs the converted normal-time q-axis current command $I_{q1}$ to the q-axis current command selector 13 as a post-conversion q-axis current command $I_{q2}$. More specifically, signals obtained by multiplying the torque command $T_{ref}$, the normal-time q-axis current command $I_{q1}$, and the normal-time q-axis current command $I_{q1}$ by "−1" are input to the sign converter 12. The sign converter 12 selects the normal-time q-axis current command $I_{q1}$ if the torque command $T_{ref}$ is positive or a signal obtained by multiplying the normal-time q-axis current command $I_{q1}$ by "−1" if the torque command $T_{ref}$ is negative, and outputs the selected signal to the q-axis current command selector 13 as a post-conversion q-axis current command $I_{q2}$.

As illustrated in FIG. 2, the post-conversion q-axis current command $I_{q2}$ is input to the q-axis current command selector 13. In addition, if the discharge command $D_{ref}$ of the electric accumulator E is output from the host controller or the like, the discharge command $D_{ref}$ and a signal "0" are input to the q-axis current command selector 13. Note that the signal "0" is output from a zero signal output unit 16 to the q-axis current command selector 13 according to the discharge command $D_{ref}$. The q-axis current command selector 13 selects the post-conversion q-axis current command $I_{q2}$ as a q-axis current command $I_{qref}$ during the normal control of the motor M, and selects the signal "0" as the q-axis current command $I_{qref}$ if the discharge command $D_{ref}$ is input. As illustrated in FIG. 1, the q-axis current command selector 13 outputs the q-axis current command $I_{qref}$ to the PI controller 3A.

As illustrated in FIGS. 1 and 2, a later-described rotation detection signal $S_r$ output by the rotation detector 2 is input to the d-axis current command generator 14. In addition, the discharge command $D_{ref}$ is input to the d-axis current command generator 14 if the discharge command $D_{ref}$ of the electric accumulator E is output from the host controller or the like. If the discharge command $D_{ref}$ is input, the d-axis current command generator 14 refers to the rotation detection signal $S_r$ to calculate a point-of-discharge d-axis current command $I_{d1'}$, and outputs the current command to the d-axis current command selector 15. A method of calculating the point-of-discharge d-axis current command $I_{d1'}$ will be described in detail later.

As illustrated in FIG. 2, the point-of-discharge d-axis current command $I_{d1'}$ and the normal-time d-axis current command $I_{d1}$ calculated by the current command calculator 11 are input to the d-axis current command selector 15. In addition, if the discharge command $D_{ref}$ of the electric accumulator E is output from the host controller or the like, the discharge command $D_{ref}$ is input to the d-axis current command selector 15. The d-axis current command selector 15 selects the normal-time d-axis current command $I_{d1}$ as a d-axis current command $I_{dref}$ during the normal control of the motor M, and selects the point-of-discharge d-axis current command $I_{d1'}$ as the d-axis current command $I_{dref}$ if the discharge command $D_{ref}$ is input. As illustrated in FIG. 1, the d-axis current command selector 15 outputs the d-axis current command $I_{dref}$ to the PI controller 3B.

The rotation detector 2 detects the rotation of the motor M and outputs the rotation detection signal $S_r$ to the speed detector 9 and the three-to-two phase converter 8. The rotation detection signal $S_r$ is defined as the rotational angle θ of the motor M in the present embodiment. The rotation detection signal $S_r$ is not limited in particular to a rotational angle, however, as long as the signal is related to the rotation of the motor M. For example, the rotation detection signal $S_r$ may be a signal representing the amount of rotation of the motor M including the number of revolutions and the like, or a signal representing torque or the like arising in the motor M. In addition, as the rotation detector 2, it is possible to adopt various types of detectors, including a resolver, a rotary encoder and a magnetic sensor.

The PI controllers 3A and 3B calculate voltage commands used to control the rotational speed of the motor M by a PI control method. More specifically, the present q-axis current $I_q$ is input from the three-to-two phase converter 8 to the PI controller 3A, as illustrated in FIG. 1. The PI controller 3A calculates the q-axis voltage command $V_{qref}$ on the basis of the deviation between this q-axis current $I_q$ and the q-axis current command $I_{dref}$ and the proportional and integral gains of the PI controller 3A. The present d-axis current $I_d$ is input from the three-to-two phase converter 8 to the PI controller 3B. The PI controller 3B calculates the d-axis voltage command $V_{dref}$ on the basis of the deviation between this d-axis current $I_q$ and the d-axis current command $I_{dref}$ and the proportional and integral gains of the PI controller 3B. The PI controllers 3A and 3B respectively output the q-axis voltage command $V_{qref}$ and the d-axis voltage command $V_{dref}$ to the two-to-three phase converter 4.

As illustrated in FIG. 1, the q-axis voltage command $V_{qref}$ and the d-axis voltage command $V_{dref}$ are input from the PI controllers 3A and 3B to the two-to-three phase converter 4. In addition, the rotational angle θ of the motor M is input from the three-to-two phase converter 8 to the two-to-three phase converter 4. On the basis of the rotational angle θ of the motor M, the two-to-three phase converter 4 converts the q-axis voltage command $V_{qref}$ and the d-axis voltage command $V_{dref}$ to three-phase voltage commands $V_{uref}$, $V_{vref}$ and $V_{wref}$.

The PWM controller 5 generates a PWM control signal $S_{pwm}$ depending on the three-phase voltage commands $V_{uref}$, $V_{vref}$ and $V_{wref}$ and outputs the PWM control signal $S_{pwm}$ to the main circuit 6. The main circuit 6 converts the DC voltage of the electric accumulator E to an AC voltage on the basis of this PWM control signal $S_{pwm}$, thereby supplying a three-phase AC current to the motor M.

As illustrated in FIG. 1, the current detector 7 detects a U-phase current $I_u$ and a W-phase current $I_w$ flowing through the motor M and outputs the currents to the three-to-two phase converter 8. In addition, a V-phase current $I_v$ is calculated from the detected U-phase current $I_u$ and W-phase current $I_w$. The V-phase current $I_v$ thus calculated is also output to the three-to-two phase converter 8.

As illustrated in FIG. 1, the U-phase current $I_u$, the W-phase current $I_w$, the V-phase current $I_v$, and the rotational angle θ of the motor M are input to the three-to-two phase converter 8. On the basis of the rotational angle θ of the motor M, the three-to-two phase converter 8 converts the U-phase current $I_u$, the W-phase current $I_w$ and the V-phase current $I_v$ to the q-axis current $I_q$ and the d-axis current $I_d$. As described above, the q-axis current $I_q$ and the d-axis current $I_d$ are used to calculate voltage commands in the PI controllers 3A and 3B, respectively.

The speed detector 9 differentiates the rotational angle θ of the motor M with respect to time to calculate the rotational angular speed ω, and outputs this rotational angular speed ω to the current controller 1. As described above, the rotational angular speed ω is used to calculate a current command in the current controller 1.

Figure 3:
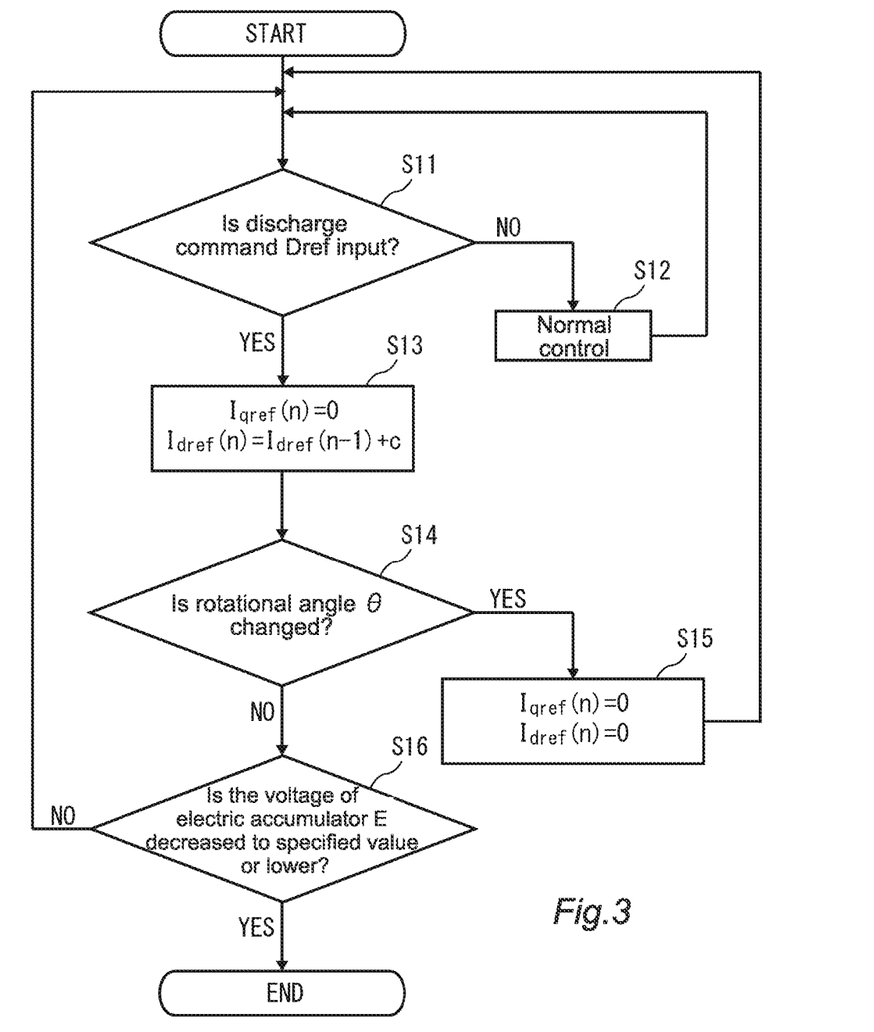
FIG. 3 is a flowchart illustrating processing contents of the motor controller according to the first embodiment.
Figure 4:
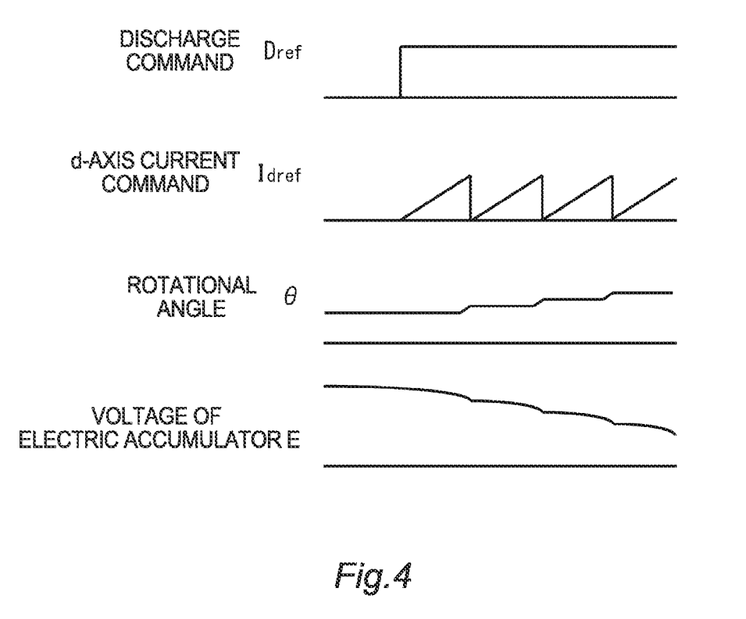
FIG. 4 is a timing chart illustrating operations of the motor controller and a battery at the time of discharging the battery in the motor controller according to the first embodiment.

Next, processing contents of the motor controller 10, in particular those of the current controller 1, will be described with reference to FIGS. 3 and 4.

If the discharge command $D_{ref}$ is not input to the motor controller 10 (if "NO" in step S11), the motor controller 10 performs the normal control of the motor M (step S12). At the time of normal control, the torque command $T_{ref}$ is input from the host controller or the like to the motor controller 10. The motor controller 10 thus controls the rotation of the motor M according to the torque command $T_{ref}$.

Specifically, in the motor controller 10, the current controller 1 outputs the post-conversion q-axis current command $I_{q2}$ and the normal-time d-axis current command $I_{d1}$ calculated on the basis of the torque command $T_{ref}$ and the rotational angular speed ω as the q-axis current command $I_{qref}$ and the d-axis current command $I_{dref}$, respectively (FIG. 2). As has been described, the motor M is driven according to the q-axis current command $I_{qref}$ and the d-axis current command $I_{dref}$.

On the other hand, if the discharge command $D_{ref}$ is input from the host controller or the like to the motor controller 10, the motor controller 10 begins discharging the electric accumulator E according to this discharge command $D_{ref}$, as will be described below.

If the discharge command $D_{ref}$ is input to the motor controller 10 (if "YES" in step S11), the discharge command $D_{ref}$ is first input to the q-axis current command selector 13, the d-axis current command generator 14 and the d-axis current command selector 15 of the current controller 1. At this time, a signal "0" is input to the q-axis current command selector 13, as illustrated in FIG. 2. The q-axis current command selector 13 outputs this signal "0" as the q-axis current command $I_{qref}$ (step S13). That is, the q-axis current command $I_{qref}$ is represented by Equation (1) shown below.

[Expression 1]

$$I_{qref}(n)=0 (n=1,2,3,\ldots) \qquad (1)$$

Here, n is the number of times the current controller 1 has output a current command after the discharge command $D_{ref}$ is input to the motor controller 10. Accordingly, $I_{qref}(n)$ means a q-axis current command output in the nth time. Note that the initial value of n is defined as "1", and a current command output initially is defined as a first current command.

The d-axis current command generator 14 calculates the point-of-discharge d-axis current command $I_{d1'}$ by adding a constant c to the d-axis current command $I_{dref}$ output in the previous time. The d-axis current command selector 15 outputs the point-of-discharge d-axis current command $I_{d1'}$ as the d-axis current command $I_{dref}$ (step S13). The initial value of the point-of-discharge d-axis current command $I_{d1'}$ is defined as "0", however. That is, the d-axis current command $I_{dref}$ is represented by Equations (2-1), (2-2), (3-1) and (3-2) shown below. Note that $I_{dref}(n)$ means a d-axis current command output in the nth time. The constant c may be determined as appropriate and can be set to, for example, "1" (lsb).

[Expression 2]

$$I_{d1'}(1)=0 \qquad (2\text{-}1)$$

$$I_{d1'}(n)=I_{dref}(n-1)+c (n=2,3,4,\ldots) \qquad (2\text{-}2)$$

[Expression 3]

$$I_{dref}(1)=I_{d1'}(1)=0 \qquad (3\text{-}1)$$

$$I_{dref}(n)=I_{d1'}(n)=I_{dref}(n-1)+c (n=2,3,4,\ldots) \qquad (3\text{-}2)$$

As described above, if the discharge command $D_{ref}$ is input to the motor controller 10, only the d-axis current is supplied to the motor M by setting the q-axis current command $I_{qref}$ to "0" and the d-axis current command $I_{dref}$ to a predetermined value. Consequently, the electric accumulator E is discharged without causing the motor M to rotate.

The motor M may rotate, however, depending on the magnitude of the d-axis current command $I_{dref}$, the accuracy of detecting the electric angle of the motor M, or the like. Accordingly, the rotational angle θ of the motor M detected by the rotation detector 2 is input to the d-axis current command generator 14 after the process of step S13, as illustrated in FIG. 2, so that the rotational angle θ is monitored. The d-axis current command generator 14 sets the point-of-discharge d-axis current command $I_{d1'}$ to "0" if the rotational angle θ is changed (if "YES" in step S14), i.e., if the motor M rotates. The d-axis current command selector 15 outputs this point-of-discharge d-axis current command $I_{d1'}$ as the d-axis current command $I_{dref}$ (step S15), thereby stopping the rotation of the motor M. The q-axis current command $I_{qref}$ output by the q-axis current command selector 13 remains at "0" (step S15). The q-axis current command $I_{qref}$ and the d-axis current command $I_{dref}$ at this time are represented by Equations (4) and (5) shown below.

[Expression 4]

$$I_{qref}(n)=0(n=2,3,4,\ldots) \quad (4)$$

[Expression 5]

$$I_{dref}(n)=0(n=2,3,4,\ldots) \quad (5)$$

If any change in the rotational angle θ of the motor M is not confirmed in the d-axis current command generator 14 after the process of step S13 (if "NO" in step S14), the motor controller 10 checks the voltage of the electric accumulator E (step S16). The motor controller 10 finishes discharging the electric accumulator E (END) if the voltage of the electric accumulator E is at a specified value or lower (if "YES" in step S16). The motor controller 10 returns to step S11 and repeats the above-described process if the voltage of the electric accumulator E has not yet decreased to the specified value (if "NO" in step S16).

As described above, the motor controller 10 according to the first embodiment supplies only the d-axis current to the motor M using the current controller 1 at the time of discharging the electric accumulator E, and gradually increases this d-axis current. If any change in the rotational angle θ of the motor M is detected by the rotation detector 2, as illustrated in FIG. 4, the current controller 1 sets the d-axis current command $I_{dref}$ to "0" to stop the rotation of the motor M. That is, the current controller 1 sets the magnitude of the d-axis current to 0 if the rotation of the motor M is detected by the rotation detector 2 at the time of discharging the electric accumulator E. On the other hand, the current controller 1 increases the d-axis current if the rotation of the motor M is not detected by the rotation detector 2. Consequently, the electric accumulator E can be discharged while preventing, as much as possible, the motor M from rotating.

Also according to the motor controller 10, the electric accumulator E can be discharged safely and rapidly without having to separately arrange a resistor for discharging the electric accumulator E or use a motor or the like for driving cooling apparatus.

Second Embodiment

Hereinafter, a second embodiment of the present invention will be described with reference to FIGS. 5 and 6. Constituent elements already described in the first embodiment and constituent elements corresponding thereto are denoted by like reference numerals and characters and will not be discussed again here.

Figure 5:
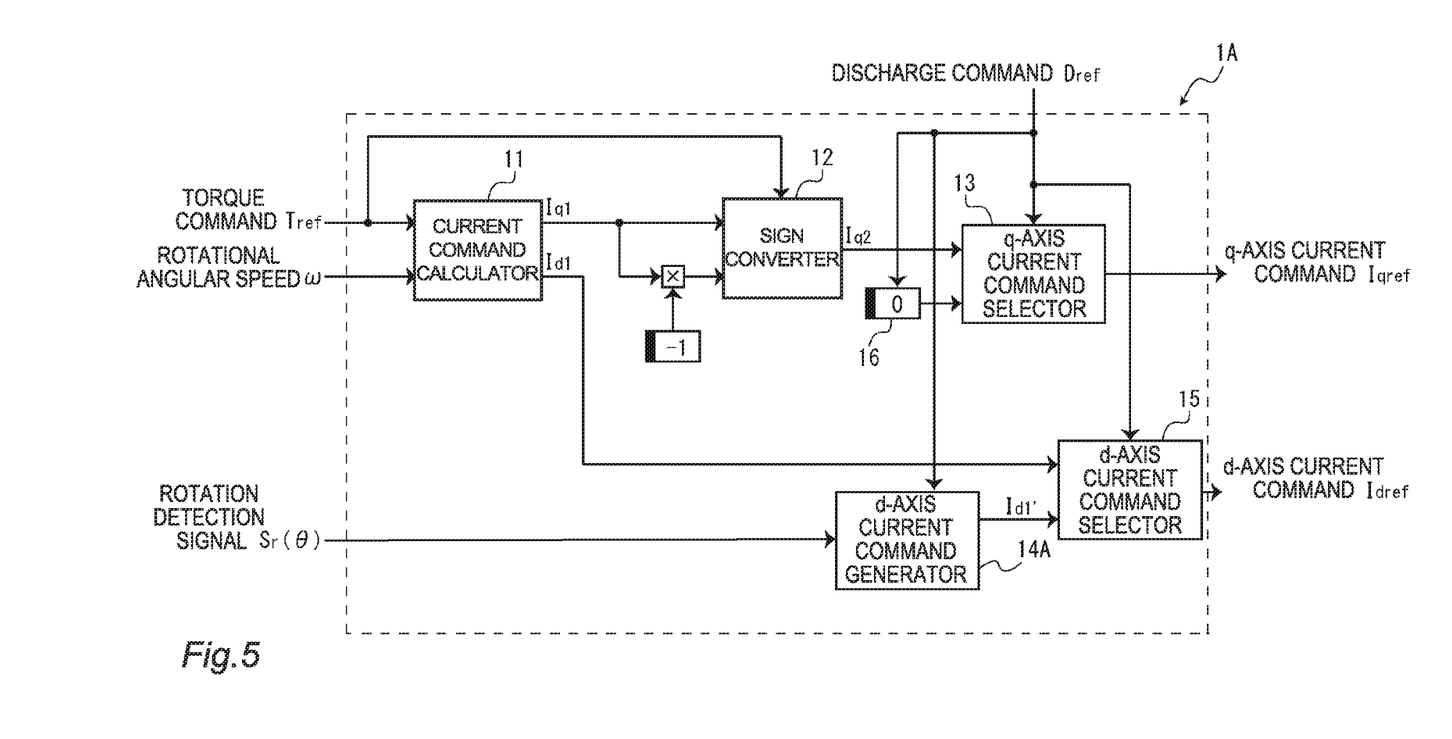
FIG. 5 is a functional block diagram of the current controller in the motor controller according to the second embodiment.

A motor controller according to the second embodiment differs from the motor controller 10 according to the first embodiment with respect to the method of calculating the point-of-discharge d-axis current command $I_{d1'}$ in the d-axis current command generator 14A of the current controller 1A (FIG. 5). The rest of the configuration of the motor controller is the same as the configuration of the motor controller 10 according to the first embodiment. Specifically, the motor controller according to the second embodiment sets the point-of-discharge d-axis current command $I_{d1'}$ to a maximum value at which the motor M does not rotate, rather than setting the point-of-discharge d-axis current command $I_{d1'}$ to "0", if the motor M rotates at the time of discharging the electric accumulator E.

Figure 6:
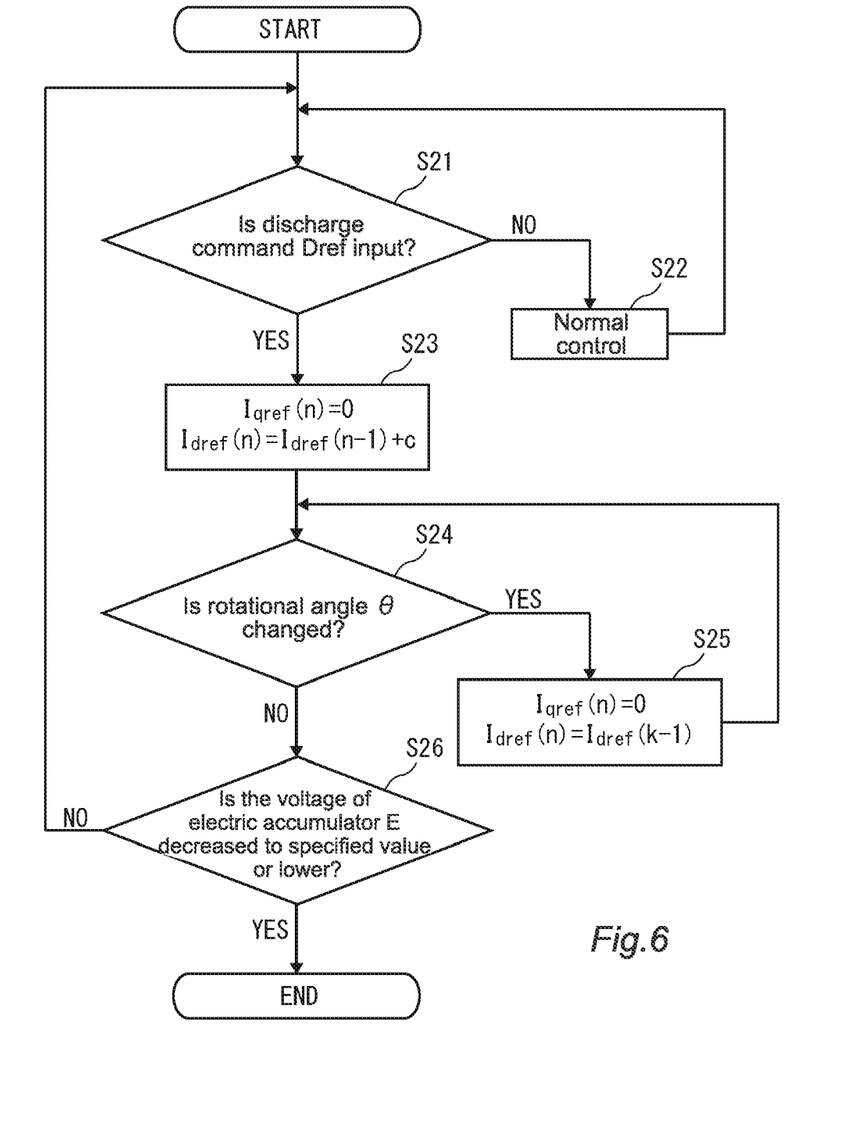
FIG. 6 is a flowchart illustrating processing contents of the motor controller according to the second embodiment.

FIG. 6 illustrates processing contents of the motor controller in the second embodiment. Note that in FIG. 6, the processes of steps S21 to S24 and S26 are the same as the processes of steps S11 to S14 and S16 in the first embodiment (FIG. 3), and therefore, will not be discussed in detail here. Hereafter, a description will be made mainly of the process of step S25.

The d-axis current command generator 14A monitors the rotational angle θ of the motor M detected by the rotation detector 2 (step S24), as in the first embodiment, after the process of step S23. If the rotational angle θ is changed (if "YES" in step S24), the d-axis current command generator 14A outputs the d-axis current command $I_{dref}$ output in the previous time as the point-of-discharge d-axis current command $I_{d1'}$. The current command selector 15 outputs this point-of-discharge d-axis current command $I_{d1'}$ as the d-axis current command $I_{dref}$ (step S25). That is, the d-axis current command $I_{dref}$ output by the current command selector 15 is represented by Equations (6) and (7) shown below. Note that the initial value of a variable k in Equations (6) and (7) shown below is n.

[Expression 6]

$$I_{d1'}(n)=I_{dref}(k-1)(n\geq 2, k=n, n-1, n-2, \ldots) \quad (6)$$

[Expression 7]

$$I_{dref}(n)=I_{d1'}(n)=I_{dref}(k-1)(n\geq 2, k=n, n-1, n-2, \ldots) \quad (7)$$

Here, the initial value of the d-axis current command $I_{dref}$ is "0" and the constant c is added to the initial value each time the process of step S23 is performed, as described above. $I_{dref}$ (k−1) in Equation (7) shown above is therefore always smaller than $I_{dref}$(n). That is, processing for decreasing the magnitude of the d-axis current is performed in step S25, so as to suppress this rotation of the motor M, if the motor M rotates.

After the process of step S25, the d-axis current command generator 14A checks the rotational angle θ of the motor M (step S24). If the rotational angle θ has been changed (if "YES" in step S24), the d-axis current command generator 14A once again performs the process of step S25. At this time, the d-axis current command generator 14 outputs the d-axis current command $I_{dref}$ output last but one, as the point-of-discharge d-axis current command $I_{d1'}$. The current command selector 15 outputs this point-of-discharge d-axis current command $I_{d1'}$ as the d-axis current command $I_{dref}$ (step S25). That is, the d-axis current command $I_{dref}$ is calculated in the same way as described above using Equations (6) and (7). Note however that k in Equations (6) and (7) is decremented each time the process of step S25 is performed.

On the other hand, the process of step S26 is performed if any change in the rotational angle θ is not detected in the d-axis current command generator 14A and the d-axis current is decreased to the extent of not allowing the motor M to rotate (if "NO" in step S24). If the voltage of the electric accumulator E is not decreased to a specified value (if "NO" in step S26) and the discharge command $D_{ref}$ is input (if "YES" in step S21), the process of step S23 is once again performed to increase the d-axis current command $I_{dref}$.

As described above, the current controller 1A of the motor controller according to the second embodiment decreases the d-axis current to the extent of not allowing the motor M to rotate, if any change in the rotational angle θ of the motor M is detected by the rotation detector 2 at the time of discharging the electric accumulator E. That is, if the rotation of the motor M is detected by the rotation detector 2 at the time of discharging the electric accumulator E, the current controller 1A decreases the d-axis current until the rotation of the motor M stops. Accordingly, the d-axis current can be maintained at a maximum magnitude at which the motor does not rotate. It is therefore possible to efficiently discharge the electric accumulator E while suppressing the rotation of the motor M.

In addition, since the motor controller according to the second embodiment controls the d-axis current to such a maximum value as not to allow the motor M to rotate, it is possible to more rapidly discharge the electric accumulator E.

Note that in the second embodiment, the process of step S23 is once again performed to increase the d-axis current command $I_{dref}$ if the voltage of the electric accumulator E is not decreased to a specified value (if "NO" in step S26) and the discharge command $D_{ref}$ is input (if "YES" in step S21) after such a value of the d-axis current as not to allow the motor M to rotate is reached by the process of step S25. Alternatively, however, the second embodiment can be configured so as to maintain the d-axis current command $I_{dref}$ at this time without performing the process of step S23 after such a value of the d-axis current as not to allow the motor M to rotate is reached by the process of step S25.

Having thus described the first and second embodiments of the present invention, the present invention is not limited to the above-described embodiments but may be modified in various other ways without departing from the gist of the invention.

Figure 7:
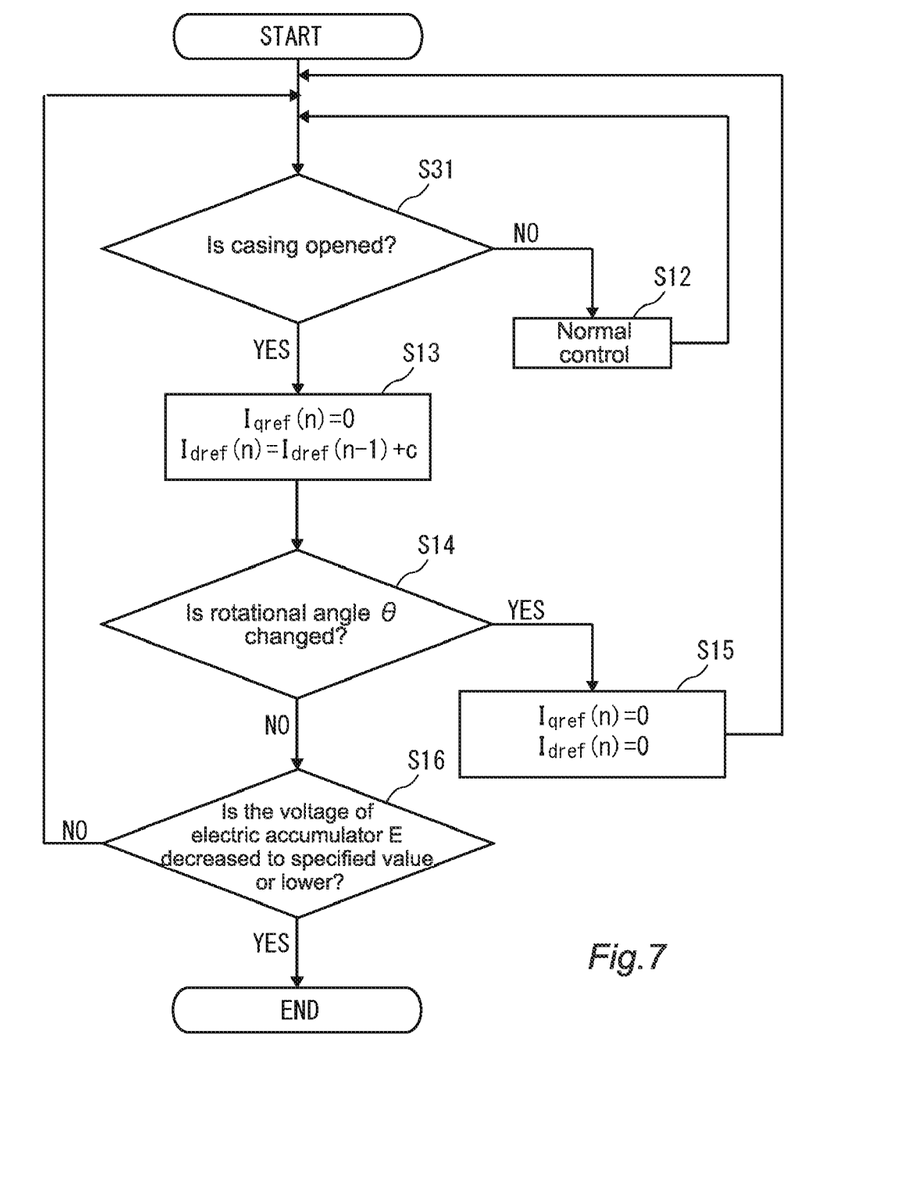
FIG. 7 is a flowchart illustrating processing contents of a motor controller according to a modified example of the first embodiment.
Figure 8:
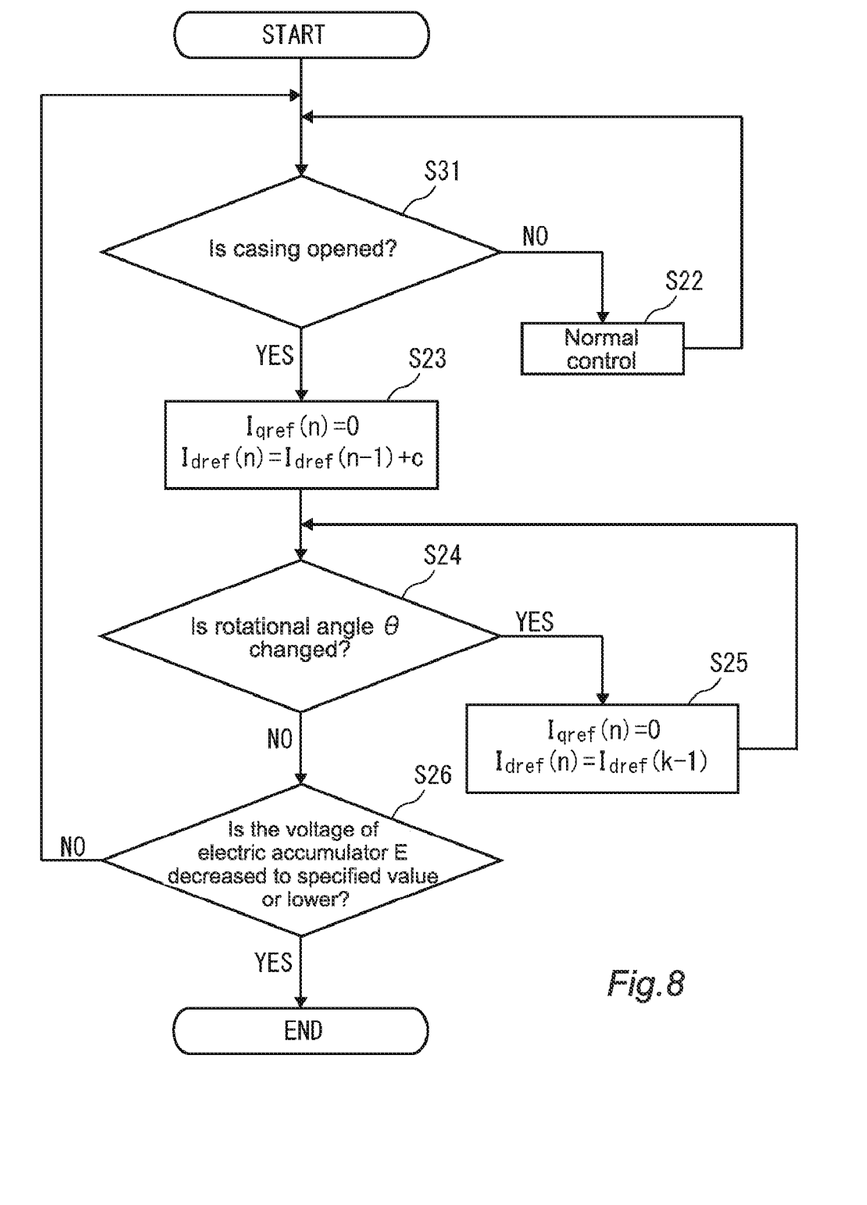
FIG. 8 is a flowchart illustrating processing contents of a motor controller according to a modified example of the second embodiment.

For example, in the above-described respective embodiments, an unequivocal discharge command $D_{ref}$ is input from the host controller or the like to the motor controller. Without limitation to this method, however, the discharge of the electric accumulator E may be initiated by detecting that a casing (not illustrated) in which the electric accumulator E, the main circuit 6 and the like are housed is opened (if "YES" in step S31), as illustrated in FIGS. 7 and 8. In this case, the act of detecting that the casing is opened corresponds to a "discharge command." To this effect, a CDS optical sensor, a contact sensor or the like may be provided in the casing. Note that processes other than the process of step S31 in FIGS. 7 and 8 are the same as those denoted by like reference characters in FIGS. 3 and 6.

Also in the above-described respective embodiments, the motor controller controls the d-axis current command $I_{dref}$ so that the d-axis current supplied to the motor M decreases when the rotation of the motor M is detected. The embodiments are not limited in particular to this method, however, as long as the rotation of the motor M can be suppressed. For example, the embodiments may be configured to suppress the rotation of the motor M by alternately changing the sign of the d-axis current command $I_{dref}$ to alternately change the direction of the d-axis current flowing through the motor M. Consequently, it is possible to more rapidly discharge the electric accumulator E.

In addition, the motor controller according to each of the above-described embodiments is configured so that a signal "0" is input from the zero signal output unit 16 to the q-axis current command selector 13 when the discharge command $D_{ref}$ is input. Without limitation to this method, however, the motor controller may be configured so that the signal "0" is always input to the q-axis current command selector 13. Also in this case, the q-axis current command selector 13 outputs the post-conversion q-axis current command $I_{q2}$ as the q-axis current command $I_{qref}$ during the normal control of the motor M. On the other hand, the q-axis current command selector 13 outputs the signal "0" as the q-axis current command $I_{qref}$ if the discharge command $D_{ref}$ is input.

Yet additionally, the motor controller according to each of the above-described embodiments is applied to construction machines. Without limitation to this application, however, the motor controller may be used in equipment other than construction machines.

Still additionally, only the d-axis current may be generated and supplied to the motor M by a method other than the methods discussed in the above-described embodiments.

Also in the above-described respective embodiments, the motor M is an IPM motor. Without limitation to this configuration, however, the motor M may be, for example, an SPM motor or an AC motor.

What is claimed is:

1. A motor controller comprising:
   a current controller for controlling a current supplied from an electric accumulator to a motor; and
   a rotation detector for detecting the rotation of the motor, wherein the current controller supplies only a d-axis current to the motor according to a discharge command and, if the rotation of the motor is detected by the rotation detector at the time of discharging the electric accumulator, the current controller makes the d-axis current smaller than the magnitude thereof at the moment the rotation of the motor is detected, so that the rotation of the motor stops.

2. The motor controller according to claim 1, wherein the current controller decreases the d-axis current to zero if the rotation of the motor is detected by the rotation detector at the time of discharging the electric accumulator, and increases the d-axis current if the rotation of the motor is not detected by the rotation detector.

3. The motor controller according to claim 1, wherein if the rotation of the motor is detected by the rotation detector at the time of discharging the electric accumulator, the current controller decreases the d-axis current until the rotation of the motor stops.

4. A construction machine comprising:
   a motor;
   an electric accumulator for supplying an electric current to the motor; and
   a motor controller according to claim 1.

* * * * *